Nov. 14, 1967 H. C. STEVENS, JR 3,352,384
SPRING APPLIED, ONE WAY DISC BRAKE
Filed Feb. 3, 1965 2 Sheets-Sheet 1

INVENTOR.
HOWARD C. STEVENS JR.

BY ATTORNEYS

Nov. 14, 1967  H. C. STEVENS, JR  3,352,384
SPRING APPLIED, ONE WAY DISC BRAKE
Filed Feb. 3, 1965  2 Sheets-Sheet 2
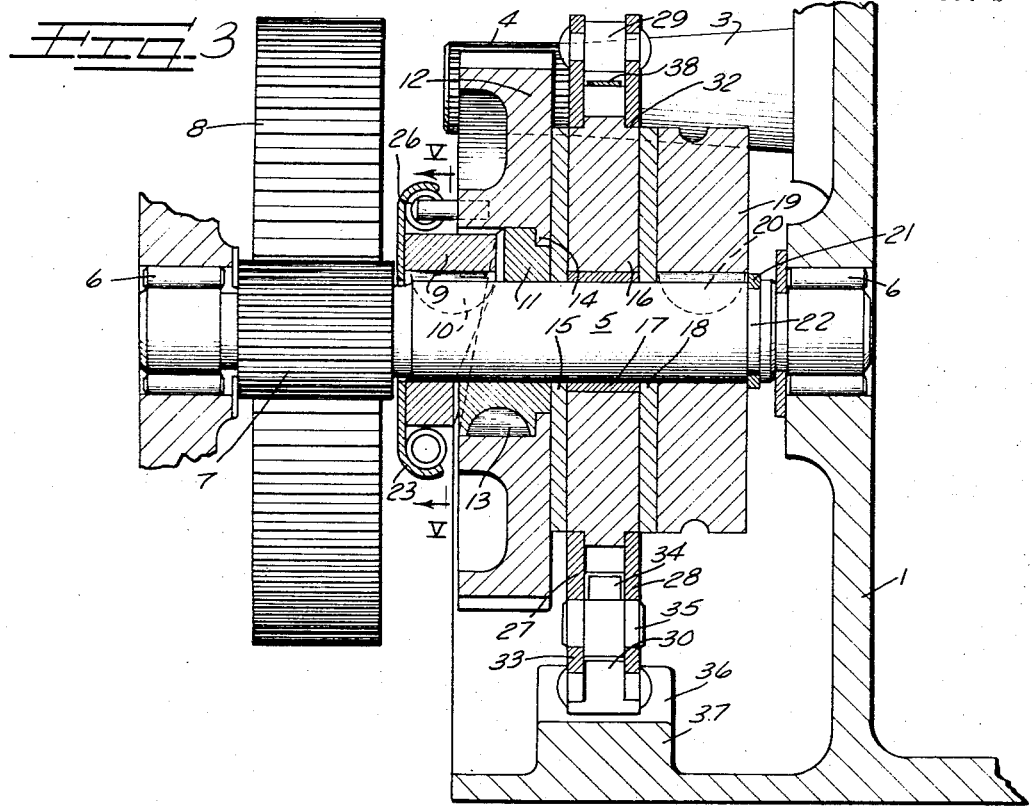
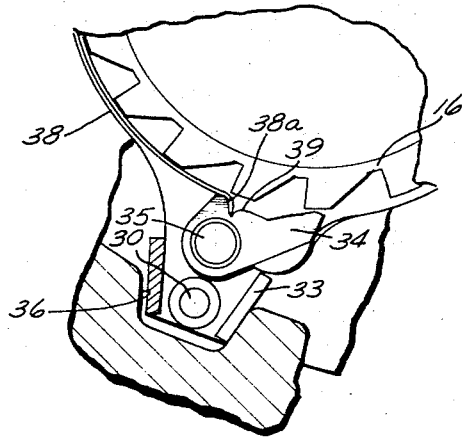
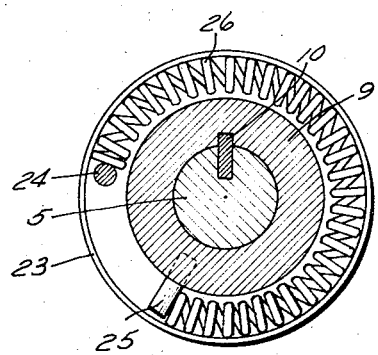
INVENTOR.
HOWARD C. STEVENS JR.
BY  ATTORNEYS

United States Patent Office 3,352,384
Patented Nov. 14, 1967

3,352,384
SPRING APPLIED, ONE WAY DISC BRAKE
Howard C. Stevens, Jr., Muskegon, Mich., assignor to Dresser Industries, Inc., Dallas, Tex., a corporation of Delaware
Filed Feb. 3, 1965, Ser. No. 429,980
8 Claims. (Cl. 188—82.7)

This invention relates to improvements in a spring biased load brake, highly desirable for use in connection with motor driven hoists and the like, although the invention will have other uses in connection with related apparatus, as will be apparent to one skilled in the art.

One use for which the instant invention is extremely desirable and efficient in operation is in connection with portable electric chain hoists, and particularly the smaller type hoists having load lifting capacities of various amounts up to several tons. Accordingly, the instant load brake is shown in operative position in a portable electric hoist, by way of example and for convenience in describing the brake.

In the past, a number of electric hoists have been built without utilizing a load brake, reliance being placed on the motor brake to hold the load in suspension. Obviously, the safer expedient is to employ a load brake which performs three separate functions namely (1) it is the medium through which the power of the motor is transmitted to the load sprocket; (2) the load brake maintains the load stationary in suspension when the motor is de-energized; and (3) the load brake acts as a governor to prevent the pull of gravity from causing the load to move downwardly faster than the normal lowering speed of the motor.

In the past, load brake assemblies have been utilized with some portable hoists but have not proven as satisfactory as is desired for various reasons, including an objectionable amount of expense for parts and installation of the load brake in the hoist frame, objectionable wear on certain parts, and noisy operation between the helical cam members, between the pawl and ratchet, or chatter between the gears.

With the foregoing in mind, it is an important object of the instant invention to provide a mechanical load brake assembly including a pawl and ratchet, which may be completely finished at the bench, and then inserted as a unit in the hoist frame.

Another object of this invention is the provision of a load brake assembly capable of positively performing each of the three functions mentioned above and with greater quietness than was heretofore obtainable in the same general class of hoist.

Also a feature of this invention is the provision of a load brake assembly in which a constant torque is always available at the brake gear, whereby gear chatter is eliminated.

A further feature of the invention is the provision of a load brake assembly so constructed as to provide a reasonable constant torque at zero load on the hoist, with a positive increasing amount as the load is added to the hoist, a reasonable constant torque for variable speed motors to operate against in lowering so that the motor may maintain its speed characteristics, and the further advantage of that structure is eliminating drift of the hook at or near zero load whenever the motor torque is suddenly removed.

It is also a feature of this invention to provide a load brake assembly utilizing helical cam members, with means provided to prevent separation therebetween of sufficient distance to cause sharp impact and banging.

Also a desideratum of this invention is the provision of a load brake assembly for hoists and the like, which assembly is extremely positive in action, highly long-lived, and highly economical both as to original cost and installation.

While some of the more salient features, characteristics and advantages of the instant invention have been above pointed out, others will become apparent from the following disclosures, taken in conjunction with the accompanying drawings, in which:

FIGURE 3 is a fragmentary sectional view taken substantially as indicated by the line III—III of FIGURE 2;

FIGURE 4 is a fragmentary sectional view showing the lower portion of FIGURE 3 with the pawl disengaged from the ratchet wheel; and FIGURE 5 is a vertical sectional view taken substantially as indicated by the line V—V of FIGURE 3.

As shown on the drawings:

Figure 1:
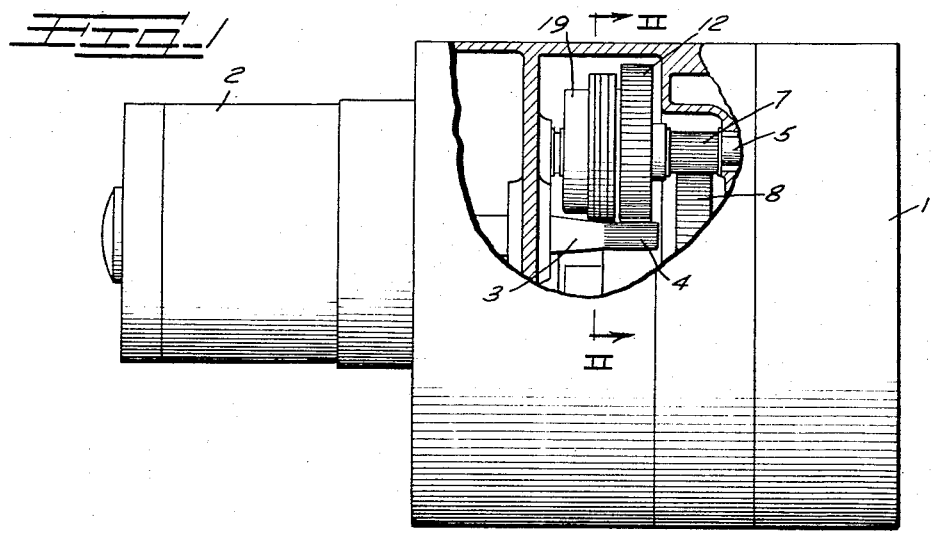
FIGURE 1 is a side elevational view of an electrical hoist equipped with a load brake assembly embodying principles of the instant invention, parts being broken away to show parts therebehind.

The illustrated embodiment of this invention is shown in association with a hoist including a hoist frame 1 on one end of which is a housing 2 for the usual electric motor and motor brake, not shown in the drawings. The motor shaft 3 projects into the hoist frame 1 and terminates therein with a drive pinion 4 from which the motor torque is transmitted by way of the load brake assembly to the hoisting mechanism.

The instant load brake assembly is all carried on a shaft 5 each end of which is suitably journalled in bearings 6—6 in appropriate formations in the hoist frame 1, as seen in FIGURE 3. Adjacent one end thereof the shaft carries a pinion 7 of larger diameter than the remainder of the shaft, and this pinion is preferably formed integrally with the shaft. This pinion 7 is the power output point of the load brake assembly through which torque from the motor is transferred to a gear 8 which may be the load gear associated with the hoist sprocket or one of a chain of hoist gears in the event further reduction is desired.

With reference more particularly to FIGURE 3, it will be seen that the load brake assembly embodies a helical cam 9 keyed to the shaft 5 by way of a Woodruff key 10, and a mating helical cam 11 floats on the shaft 5 inside a load brake gear 12 which is keyed to the helical cam 11 as indicated at 13. This brake gear 12 meshes with the aforesaid drive pinion 4 on the motor shaft 3 and is driven from the motor. The cam member 11 is disposed in an aperture in the brake gear 12, and as seen clearly in FIGURE 3 there is a complemental shoulder abutment at 14 between the cam and the gear so that the gear may be urged to the right as seen in this figure by the cam member. The brake gear 12 is in face-to-face relationship with a friction disc 15 floating on the shaft 5, and that disc in turn is in face-to-face relationship with a ratchet wheel 16 riding freely on the shaft 5 on a bearing 17. The ratchet wheel is also in face-to-face relationship with a second friction disc 18 riding freely on the shaft, which disc 18 in turn is in face-to-face relationship with the flange 19 keyed to the shaft with a Woodruff key 20. Further movement to the right of the flange 19 from the position seen in FIGURE 3 is prevented by a retainer 21 secured in a groove 22 in the shaft.

Between the pinion teeth 7 and the cam member 9, an annular cup-shaped spring holder 23 is positioned and when this spring holder is in abutment with the pinioin teeth, movement of the cam member 9 to the left as seen in FIGURE 3 is stopped. The spring holder is larger in diameter than the cam member 9, to provide an annular space therebetween. A self-locking pin 24 driven into a suitable opening in the brake gear 12 has its outer end extending into this annular space between the spring holder and the cam member 9. Another pin 25 is similarly secured in the cam member 9 and extends into the spring holder as seen best in FIGURE 5. Between these pins in the holder or retainer 23 a compression spring 26 is positioned with its ends abutting the respective pins. When the load brake is assembled, this spring 26 is preloaded by being placed under relatively high compression. Such compression causes a torsional preload or bias load in the form of a torque between the brake gear 12 and the cam member 9, which causes the cam members 9 and 11 to urge the brake gear against the friction disc 15, thus tending to lock the assembled elements together including the brake gear, the friction disc 15, the ratchet wheel 16, the friction disc 18, and the flange 19.

The ratchet wheel 16 is disposed in a cage comprising a pair of side plates 27 and 28, connected together in spaced relationship by means of spacer studs 29 and 30 at opposed points. Each of these plates is centrally apertured as indicated at 31 in FIGURE 2, and the ratchet wheel is shouldered on each side as indicated at 32 in FIGURE 3, whereby the ratchet wheel may be disposed in the cage between the two side plates and have ample face-to-face contact through the apertures 31 with the friction discs 15 and 18.

In a projecting portion 33 of the ratchet wheel cage in which the spacer stud 30 is located, a pawl 34 is mounted on a pivot stud 35 in position to engage with or be disengaged from the teeth of the ratchet wheel. The mounting of the pawl directly in the ratchet wheel cage possesses several advantages over mounting the pawl on some portion of the hoist frame 1 outside of the ratchet cage. First, it allows the entire load brake assembly to be completed at the bench, and subsequently inserted as a unit in the hoist frame, it being only necessary to journal the shaft ends in the bearings 6—6, and locate the projecting portion 33 of the ratchet wheel cage in a notch or slot 36 in a formation 37 integral with the frame 1. Positioning the portion 33 in the notch does not interfere with the slight axial movement of the cage relatively to the shaft 5, and it effectively prevents rotation of the ratchet wheel cage. This arrangement is far advantageous over a pawl mounted in the hoist frame, the latter requiring more machining in the hoist and often introducing alignment and tolerance problems. Further, the reaction developed by the pawl on the side plates of the cage is imposed in turn on the ratchet wheel at the aforesaid shouldered portions 32, providing the effect of damping any tendency for the ratchet member to vibrate. The action within a load brake of the type here set forth is naturally oscillatory and any damping that can be provided to prevent such vibration is of considerable merit.

Figure 2:
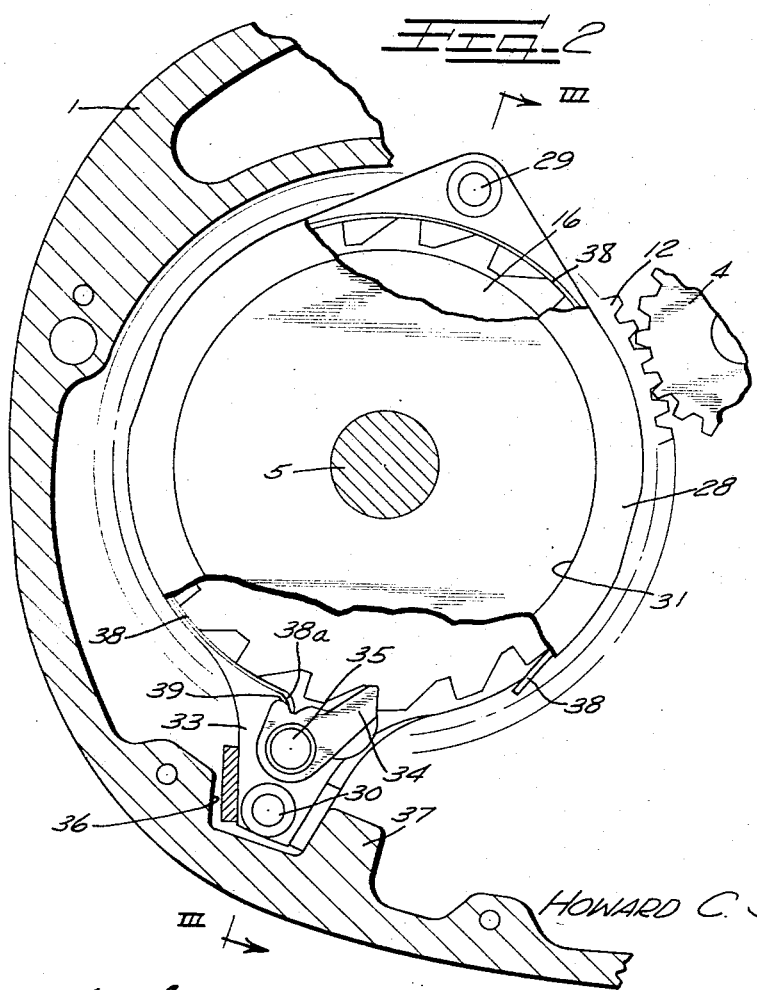
FIGURE 2 is a fragmentary enlarged vertical sectional view taken substantially as indicated by the line II—II of FIGURE 1, looking in the direction of the arrows, but with the parts rotated slightly counterclockwise for clarity in showing.

The pawl 34 is engaged with and disengaged from the teeth on the ratchet wheel 16 by means of a circumscribing spring 38 overlying the teeth on the ratchet wheel, this spring exerting light radial pressure against the edges of the ratchet teeth. One end of the spring is inwardly turned as indicated at 38a in FIGURES 2 and 4 to seat in a notch 39 in the pawl while the other end of the spring may remain free. Consequently when it is desired to lower a load, and the motor is energized in the proper direction for that purpose, there will be a slight movement of the spring 38 by virtue of its contact with the ratchet teeth so that the pawl will be pivoted by the spring into engaged position as seen in FIGURE 2. When it is desired to raise a load, the opposite is true, the ratchet wheel moving counterclockwise as viewed in FIGURE 2 and the spring forcing the pawl to free position as seen in FIGURE 4.

The flat friction spring 38 when disengaging the pawl throws it completely out of contact with the teeth of the ratchet wheel, as is seen in FIGURE 4. This avoids wear of the type where a pawl is permitted to continually ride on the ratchet teeth, and also provides a silent ratchet and pawl construction since the clicking noise between a freely riding pawl and the ratchet teeth is eliminated.

In operation, the instant load brake assembly is extremely positive, quiet, and quick acting. With reference more particularly to FIGURES 2 and 4, let it be assumed that the parts are in the position seen in FIGURE 2 and it is desired to raise a load. In this event the motor pinion 4 will rotate the brake gear 12 counterclockwise as seen in FIGURE 2. This will cause relative movement between the cam members 9 and 11 tending to spread the cam members and forcing the rotary parts of the load brake assembly into one rotating unit. At the same time the ratchet teeth act upon the friction spring 38, causing this spring to throw the pawl 34 into completely released position as seen in FIGURE 4, and all the rotating parts of the assembly including the ratchet wheel 16 rotate with the shaft 5 during raising of the load.

When it is desired to hold the load in suspension, the suspended load will exert a pull on the chain and tend to rotate the shaft 5 clockwise causing the cam members 9 and 11 to lock the rotating parts into a unit. At the same time the pawl is immediately shifted to engaged position as seen in FIGURE 2, preventing rotation of the ratchet and therefore preventing rotation of any of the other parts of the assembly, because these parts are locked together through the friction discs 15 and 18. The entire load brake assembly is then in fixed position and the load cannot move. The parts of the brake assembly are locked together in fixed position so rapidly that the load makes no noticeable descending movement and cannot drift downward thereafter.

When it is desired to lower a load the motor pinion will rotate the brake gear 12 clockwise as seen in FIGURE 2 maintaining the pawl engaged with the teeth of the ratchet wheel, but actuating the cam members 9 and 11 to release pressure on the friction discs 15 and 18 and permit the load to respond to the pull of gravity and descend. The instant invention provides other functions and advantages, however. The moment the load descends at a faster rate than motor rotation, the cam members 9 and 11 will again exert pressure on the brake gear tending to lock the rotating parts of the assembly into a solitary unit. This action brakes the load until the motor rotation once again drives the load, and this repetitive on and off action of the brake synchronizes the load speed with the motor speed affording precise control over the load during lowering, the load brake assembly thereby acting as a governor preventing too rapid dropping of the load.

The operation of the load brake assembly is materially aided by virtue of the constant torque applied by the aforesaid spring 26. This may be predetermined as a reasonable percentage of the desired torque during lowering of a load. In effect, therefore, there is a constant torque at zero load on the hoist with a slightly increasing amount as the load is added to the hoist. Consequently, a variable speed motor dependent on a relatively constant load to hold its speed characteristics is readily usable because of the constant torque for the motor to operate against in lowering the load. Further, there will be extremely little drift of the load hook at or near zero load whenever the motor torque is suddenly removed. It should also be noted that much quieter operation may be obtained from the gearing with the constant torque always available as provided by the spring 26. This constant torque is sufficient to eliminate chattering between the brake gear 12 and the motor drive pinion 4. The bias torque constantly provided by the spring 26 also maintains the two helical cam members 9 and 11 so associated that they cannot open or separate all the way, particularly when the motor is suddenly turned on in lowering and the load is zero or near zero. Thus, loud impact between the two cam members is prevented. One other advantage resulting from the bias torque is the fact that cam member 11 maintains the brake gear 12 in face-to-face relationship with the friction disc 15 and since the center bore of this gear is relatively short, the holding of the gear against the friction disc aids materially in maintaining proper alignment between the teeth of the brake gear and the motor drive pinion.

In addition, it may be noted that the load brake assembly requires but a small amount of space in the hoist frame 1 owing to its compact structure, and the ease with which the assembly may be inserted in the frame as a complete unit adds materially to the economy of production.

It will be understood that modifications and variations may be effected without departing from the scope of the novel concepts of the present invention.

I claim as my invention:

1. In a unitary load brake assembly mountable as a unit in hoisting mechanism and the like,
   a shaft having a journal at each end,
   a pinion on said shaft adjacent one journal,
   a helical cam member keyed to said shaft,
   a complemental helical cam member floating on said shaft,
   a brake gear keyed to said complemental cam member,
   a friction disc free on said shaft for confronting relationship on one side with said gear,
   a cage having openings in the sides thereof,
   a ratchet wheel in said cage and arranged for face to face contact on one side with the other side of said friction disc,
   a pawl in said cage engageable with the teeth of said ratchet wheel,
   means to cause engagement and disengagement of said pawl with the ratchet wheel,
   a second friction disc for face to face contact with the other side of said ratchet wheel,
   a flange for face to face contact with said second friction disc,
   means preventing movement of said flange in a direction away from said second friction disc,
   a spring holder around said shaft adjacent said pinion, and
   a preloaded spring in said holder normally urging said cam members together to cause braking contact with said friction discs.

2. In a unitary load brake assembly mountable as a unit in hoisting mechanism and the like,
   a shaft,
   a flange member on said shaft,
   a friction disc on said shaft adjacent said flange,
   a ratchet wheel member on said shaft adjacent said disc,
   a second friction disc on said shaft adjacent said ratchet wheel,
   a brake gear member on said shaft adjacent said second disc,
   cam means comprising helically engageable sections carried by said shaft for urging said members and discs into braking contact, and
   a preloaded spring carried by said shaft and connected to one of said cam sections constantly urging said cam means rotationally toward braking position.

3. In a load brake assembly for hoists and the like,
   a shaft,
   a gear on said shaft through which the shaft is driven,
   braking means adjacent said gear to act on the same,
   actuating means for said braking means including a pair of complemental helical cam members,
   a spring cage around said shaft,
   a pin extending from said gear into said cage,
   a pin extending from one of said cam members into said cage, and
   a preloaded spring in said cage with its ends bearing against said pins to urge said braking means into breaking position through said helical cam members.

4. In a unitary load brake assembly for hoists and the like,
   a shaft,
   a flange member on said shaft to rotate therewith,
   means limiting movement of said flange along said shaft in one direction,
   a friction disc adjacent said flange member,
   a ratchet member free on said shaft adjacent said disc,
   a pawl associated with said ratchet member,
   a second friction disc adjacent said ratchet member,
   a gear member adjacent said second disc through which said shaft is driven,
   a pair of complemental helical cams on said shaft operable to lock said discs and said member into a rotary unit when said shaft rotates in one direction, and
   spring means coupled between said shaft and said cams tending in the absence of a hoist load to continuously hold said members and disc partially locked together.

5. In a hoist brake assembly including a shaft journaled for rotation, means to receive a hoist load tending to rotate said shaft, and a plurality of elements tandemly arranged on said shaft at least one of which is rotationally secured to said shaft, said elements being axially movable into braking engagement against each other to effect a rotational braking of said shaft, the improvement comprising means providing a controlled axial movement of said elements against each other to continuously effect a partial braking of said shaft in the absence of a hoist load, said last recited means comprising:
   (a) a pair of complementary camming members mounted on said shaft, a first camming member of which is rotatably secured to said shaft and a second camming member of which is rotatably free of said shaft, and
   (b) resilient means coupled to at least one of said camming members acting to urge said second camming member against said elements to place them into said braking relation.

6. A hoist brake assembly comprising in combination
   (a) a frame,
   (b) a shaft journalled for rotation in said frame,
   (c) load bearing means tending to rotate said shaft in a first direction in response to a hoist load applied thereto,
   (d) a pair of complementary camming members mounted on said shaft, including a first cam member rotatably secured to said shaft and a second cam member rotatably free of said shaft,
   (e) a drive gear mounted on said shaft secured to the second of said cam members and adapted to be operably connected to a hoist load drive,
   (f) a ratchet member mounted on said shaft rotatably free thereof tandem to said drive gear,
   (g) a flange member rotatably secured to said shaft tandem to said ratchet member and secured against lateral movement on said shaft in a direction away from said ratchet member,
   (h) friction discs mounted on said shaft at least one of which is intermediate and in face to face engagement between the drive gear and said ratchet and another is intermediate and in face to face engagement between said ratchet and said flange member, and
   (i) means acting against said camming members effecting a continuous no-load urging of said shaft-mounted elements against each other to effect a partial braking of said shaft in the absence of a hoist load.

7. The brake assembly according to claim 6 in which said last recited means comprises a preloaded spring coupled between one of said camming members and said shaft.

8. The brake assembly according to claim 7 including
(a) a stationary cage at least partially encircling the periphery of said ratchet member,
(b) pawl means pivotally mounted on said cage for engagement with said ratchet member, and
(c) means connected to said pawl operable when a hoist load is ascending to pivot said pawl to a position removed from contact with said ratchet member.

References Cited

UNITED STATES PATENTS

| | | | |
|---|---|---|---|
| 2,079,106 | 5/1937 | Cirac et al. | |
| 2,551,000 | 5/1951 | Horton | 192—46 |
| 2,727,604 | 12/1955 | Robertson | 254—186 X |
| 2,894,610 | 7/1959 | Harrington | 188—134 X |
| 3,260,331 | 7/1966 | Borman | 188—170 X |

MILTON BUCHLER, *Primary Examiner.*

G. E. HALVOSA, *Assistant Examiner.*